(No Model.)
W. E. HARRIS.
BRASS FOR ROLLING MILLS.
No. 330,697. Patented Nov. 17, 1885.
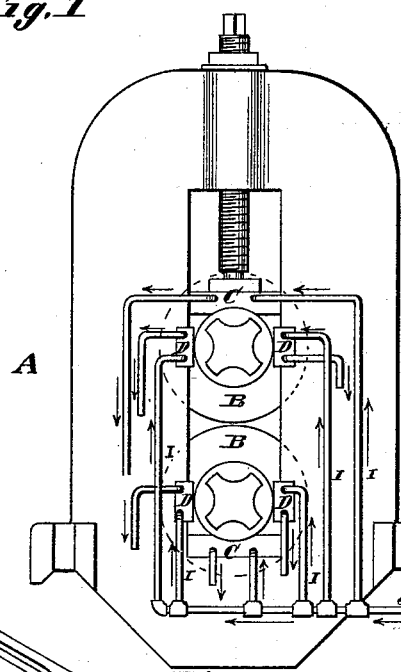
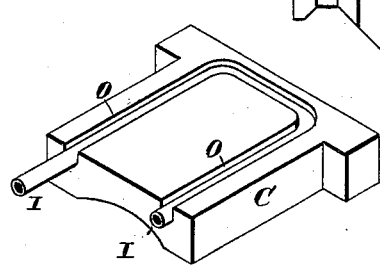
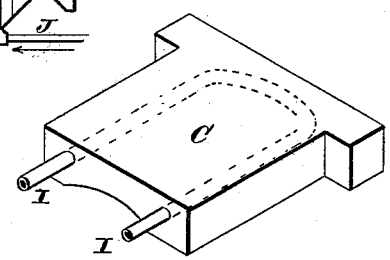
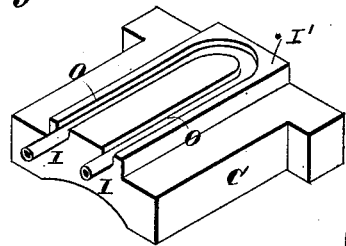
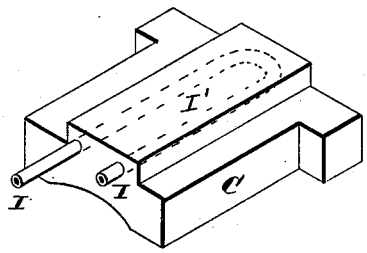
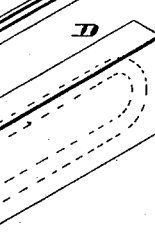
Attest
Edward Steer
Geo. L. Wheelock
Inventor;
Wm E. Harris
By Knight Bros
attys
N. PETERS, Photo-Lithographer, Washington, D. C.

UNITED STATES PATENT OFFICE.

WILLIAM E. HARRIS, OF ST. LOUIS, MISSOURI.

BRASS FOR ROLLING-MILLS.

SPECIFICATION forming part of Letters Patent No. 330,697, dated November 17, 1885.

Application filed May 8, 1885. Serial No. 164,859. (No model.)

*To all whom it may concern:*

Be it known that I, WILLIAM E. HARRIS, of the city of St. Louis, in the State of Missouri, have invented a certain new and useful Improvement in Means for Cooling Bearings or Brasses for Journals, of which the following is a full, clear, and exact description, reference being had to the accompanying drawings, forming part of this specification, and in which—

Figure 1 is an end view of a pair of rolling-mill rolls having my invention applied to the brasses or bearings thereof, each section or plate of the brass or bearing having a pipe embedded in and independent of any other section or plate, as hereinafter described. Figs. 2, 3, 4, 5, 6, and 7 are perspective views of different forms of plates or sections to which my invention is applicable. Fig. 8 is a top view showing the application of a pair of my looped pipes to a single section or plate.

My invention is a means for cooling each brass or plate independently of the others, and relates to those cooling devices in which pipes are combined with the brasses or bearings for carrying cooling-liquid through them. As heretofore constructed, it has been the custom to either cast a bearing with passages through it for the cooling-liquid, or cast a whole bearing with a coil of pipe within it, and then divide the bearing and coil lengthwise of the journal-opening to form the separable members, or cast upper and lower members of a bearing with passages connected at the faces by short pipe-sections. The first-mentioned construction necessitates careful casting and the careful connection of the supply-pipes with the passages. In the second and third constructions mentioned the passages cross the faces of the two members and require very careful packing at the faces. In all three devices referred to the construction is not so simple as that which forms the subject of the present invention.

My invention consists, first, of a U-shaped pipe embedded in the bearing-plate or section at the time of casting.

My invention consists, further, in a bearing-plate or section formed with a U-shaped groove to receive the U-shaped pipe, to permit the substitution of a worn plate or section by a new one, so as to use the same cooling-pipe with a number of plates or sections.

A represents one end of a frame of a pair of rolling-mill rolls, B. C represents the top and bottom plates or sections of brasses or bearings, and D the side plates or sections.

I prefer to form each brass section or bearing-plate with U-shaped grooves or recesses O, to receive U-shaped cooling-pipes I, (see Figs. 2, 3, 4, and 8;) or the plates or sections may be cast with the pipes within them, and extending beyond the plates or sections, as shown in Figs. 5, 6, and 7. The pipes may all be connected with a single supply-pipe, J, (see Fig. 1,) and the cooling liquid or water after passing through them may be discharged onto the ground.

In Figs. 2 and 6 ordinary sections are shown, the recess being shown in Fig. 2 and the section cast around the pipe in Fig. 6. In Figs. 3 and 7 sections with strengthening central projections, I', are shown, and in Figs. 4 and 5 side sections are shown.

In Fig. 8 two pipes are shown in one section, which may be used when desirable.

In my construction there is no chance for leakage, so that water does not come in contact with the journals, which would result in washing off the grease and depositing lime, which latter is injurious to the journals and brasses, causing them to wear away quickly.

My construction is applicable to all kinds of rolling-mills—such as sheet-iron mills, steel-mills, tin-plate mills, copper-plate mills, guide-mills, wire-mills, &c.

The bearings may be made of brass, (from which the well-known term of "brasses" is derived,) or they may be made of bronze, Babbitt, or other metal.

Having thus described my invention, the following is what I claim as new therein and desire to secure by Letters Patent:

1. A brass section or bearing-plate having a U-shaped pipe embedded therein, and extending in line with the journal-recess through one side of the brass section or bearing-plate, substantially as set forth.

2. A brass section cast with a groove or recess, O, and provided with a pipe, I, occupying said groove, the pipe and section being separable, substantially as set forth.

3. A brass section cast with a projection, I', having a groove or recess, O, and a pipe, I, occupying said groove, substantially as set forth.

4. A brass section, C, cast with a U-shaped groove or recess, O, and a U-shaped pipe, I, occupying the groove and separable therefrom, substantially as set forth.

WILLIAM E. HARRIS.

In presence of—
  GEO. H. KNIGHT,
  SAML. KNIGHT.